United States Patent [19]

Blyth

[11] Patent Number: 5,344,225

[45] Date of Patent: Sep. 6, 1994

[54] LAWN MOWER ATTACHMENT

[76] Inventor: Clinton A. Blyth, 4742 Devonshire St., Boulder, Colo. 80301

[21] Appl. No.: 972,897

[22] Filed: Nov. 6, 1992

[51] Int. Cl.$^5$ .................. G09F 11/02; B65D 85/00
[52] U.S. Cl. ................. 312/34.4; 280/33.992; 280/727; 206/225; 206/408; 206/564
[58] Field of Search ............... 312/34.4, 237; 108/25; 206/225, 229, 408, 409, 564; 56/DIG. 18; 280/33.992, 727; 241/101.2

[56] References Cited

U.S. PATENT DOCUMENTS

| | | | |
|---|---|---|---|
| 1,646,100 | 10/1927 | Ordway | 206/225 |
| 2,210,972 | 8/1940 | Christenson | 108/25 X |
| 2,687,589 | 8/1954 | Brockway | 280/33.992 X |
| 2,738,898 | 3/1956 | Lee | 312/34.4 X |
| 3,438,644 | 4/1969 | McMillan et al. | 280/33.992 |
| 3,826,361 | 7/1974 | Heckrodt | 221/47 |
| 3,843,071 | 10/1974 | Graham | 206/408 X |
| 4,512,476 | 4/1985 | Herrington, Jr. | 206/554 |
| 4,513,983 | 4/1985 | Calder | 280/33.992 |
| 4,805,800 | 2/1989 | Nocek et al. | 221/63 |

*Primary Examiner*—Mark Rosenbaum
*Assistant Examiner*—Khan V. Nguyen

[57] ABSTRACT

A lawn mower attachment is provided which dispenses plastic bags for the collection of lawn clippings. The lawn mower attachment includes a housing adapted to store interiorly therein a roll or other supply of plastic trash bags. An elongated slot is located on the housing through which plastic trash bags may be withdrawn from the interior of lawn mower attachment. The lawn mower attachment also includes a rectangular storage bin with a sliding cover for bag ties or the like recessed into the housing. A cylindrical cavity is recessed into the housing proximal to the storage bin and has a suction cup disposed at the bottom thereof to secure a beverage can or bottle. A pair of opposed arms, one of which is extensible, facilitates attachment of the housing to a lawn mower handle.

11 Claims, 4 Drawing Sheets

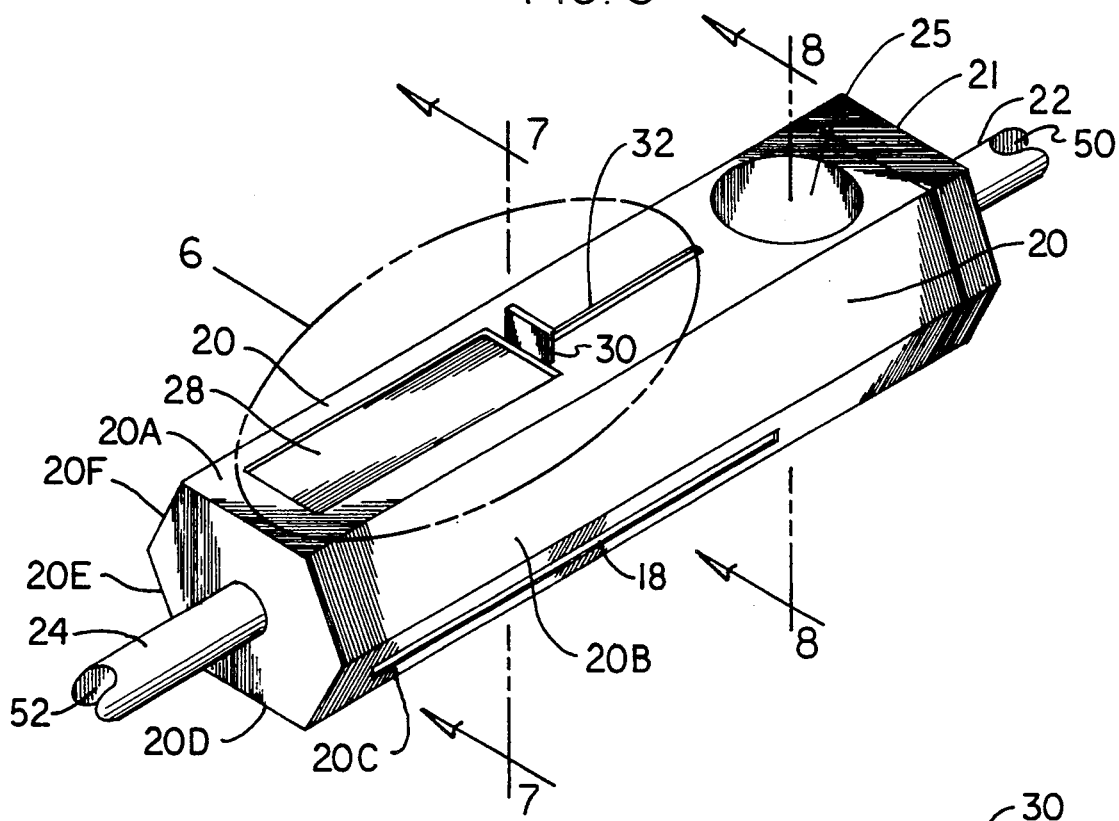
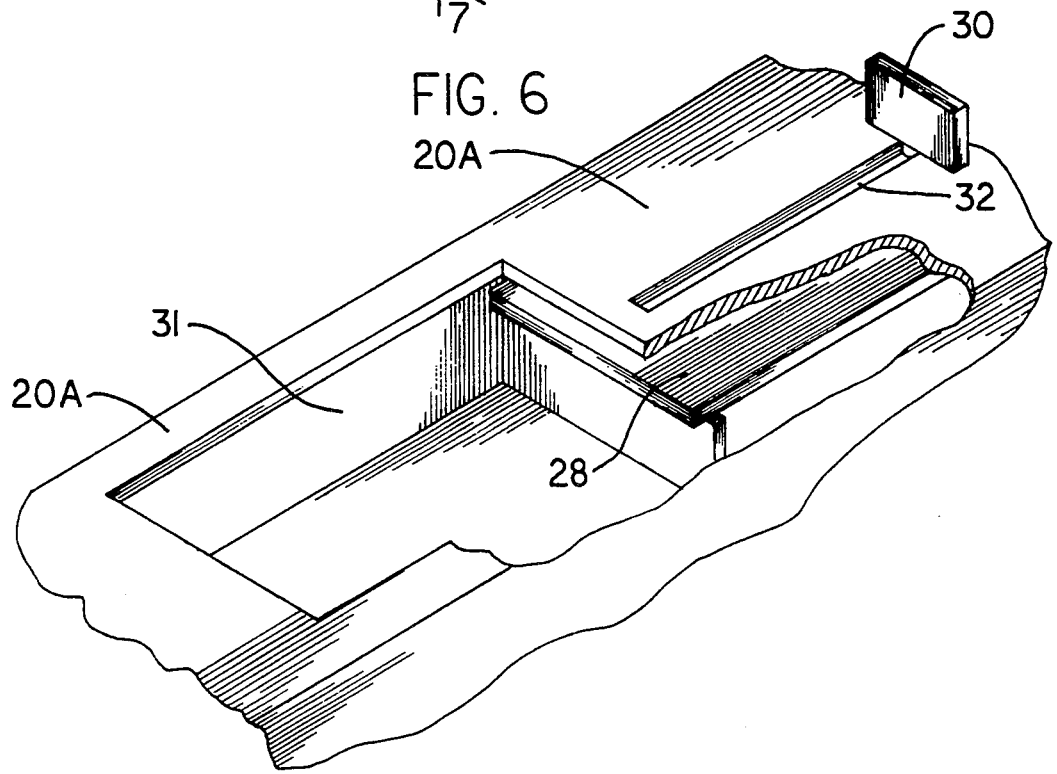

LAWN MOWER ATTACHMENT

BACKGROUND OF THE INVENTION

1. Field of the Invention

The present invention relates generally to an attachment for a lawn mower, and more particularly, to a lawn mower attachment which stores and dispenses plastic trash bags, especially adapted to contribute to the efficient collection and disposal of lawn clippings.

2. Description of the Prior Art

Dispensers for the storage and dispersal of plastic bags are known in art. A dispenser for plastic bags which has a container with a dispenser opening from which the bags may be withdrawn is known (U.S. Pat. No. 4,805,800). In this device the bags are stacked in a nested relation and are connected by a line of weakened resistance. The bag is removed from the stack by tearing along the line of weakened resistance.

Another plastic bag dispenser has the bags stacked in a nested relation; however, the bags are not connected (U.S. Pat. No. 4,512,476). When the top bag is removed from the stack, the next bag is pulled into the top position for removal.

A plastic bag dispenser system includes a housing which has a cylindrical roll of plastic bags located within (U.S. Pat. No. 3,826,361). The plastic bag passes through an opening in the housing. The bag is then detached from the roll.

A trash bag dispenser comprises a shaft (U.S. Design Pat. No. 285,850). A cylindrical roll of plastic trash bags rotates about the shaft which permits the bags to be removed from the roll.

Thus, while the foregoing body of prior art .indicates it to be well known to use a device to dispense plastic trash bags, none of the above prior art contemplates attaching a plastic trash bag dispenser to a lawn mower. Nor does the prior art described above teach or suggest a housing from which the plastic trash bags are dispensed which includes a rectangular storage area or a beverage holder. Other advantages of the present invention over the prior art also will be rendered evident.

SUMMARY OF THE INVENTION

To achieve the foregoing and other advantages, the present invention, briefly described, provides a lawn mower attachment which dispenses plastic bags for the collection of lawn clippings. The lawn mower attachment includes a housing adapted to store interiorly therein a roll or other supply of plastic trash bags. An elongated slot is located on the housing through which plastic trash bags may be withdrawn from the interior of lawn mower attachment. The lawn mower attachment also includes a rectangular storage bin with a sliding cover for bag ties or the like recessed into the housing. A cylindrical cavity is recessed into the housing proximal to the storage bin and has a suction cup disposed at the bottom thereof to secure a beverage can or bottle. A pair of opposed arms, one of which is extensible, facilitates attachment of the housing to a lawn mower handle.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved lawn mower attachment which has all of the advantages of the prior art and none of the disadvantages.

It is another object of the present invention to provide a new an improved lawn mower attachment which may be easily and efficiently manufactured and marketed.

It is a further objective of the present invention to provide a new and improved lawn mower attachment which is of durable and reliable construction.

An even further object of the present invention is to provide a new and improved lawn mower attachment which is susceptible of a low cost of manufacture with regard to both materials and labor, and which accordingly is then susceptible of low prices of sale to the consuming public, thereby making such a lawn mower attachment available to the buying public.

Still a further object of the present invention is to provide a new and improved lawn mower attachment which is adapted to dispense plastic trash bags suitable for storing lawn clippings and other debris from an integral storage compartment.

Still yet a further object of the present invention is to provide a new and improved lawn mower attachment which has a beverage holder so as to allow one to comfortably drink while mowing the lawn.

It is still a further object of the present invention is to provide a new and improved lawn mower attachment with a storage area to keep twist ties for securing the plastic trash bags in an easily accessible and protected location.

Still a further object of the present invention is to provide a new and improved lawn mower attachment that would permit the efficient bagging of lawn clippings.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 5 is a perspective view of the lawn mower attachment showing the storage cover closed.

FIG. 6 is a view of area 6 of FIG. 5 which shows the storage cover open.

DESCRIPTION OF THE PREFERRED EMBODIMENT

With reference now to the drawings, a new and improved Lawn Mower Attachment for dispensing plastic trash bags which embodies the principles and concepts of the present invention will be described.

Figure 1:
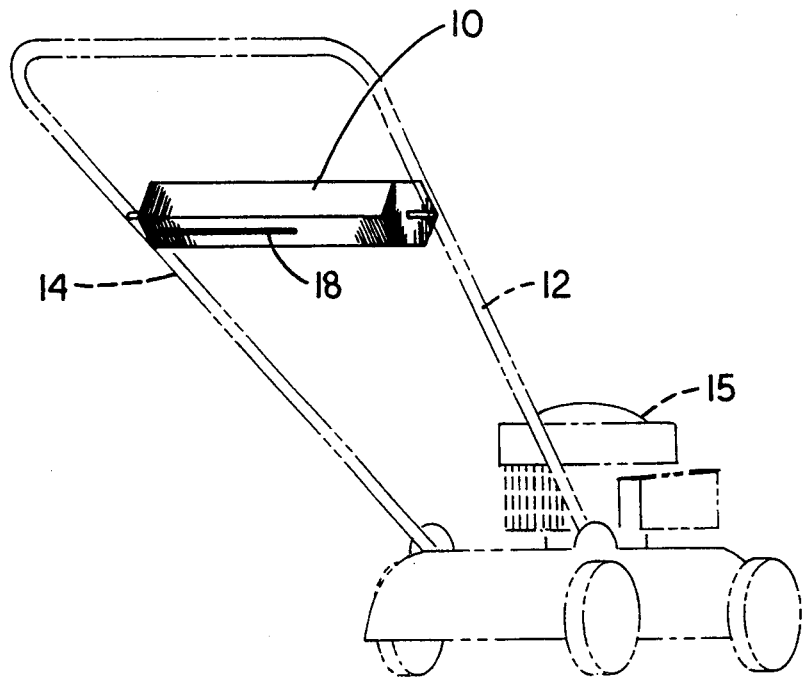
FIG. 1 is an environmental perspective view showing the preferred embodiment of the lawn mower attachment of the invention.

Turning initially to FIG. 1, the lawn mower attachment 10 (also referred to as dispenser 10) is shown mounted on the usual U-shaped handle of a conventional lawn mower 15 (or other similar lawn appliance), the details of which latter form no part of the present invention. The dispenser 10 is adapted to be removably mounted transversely and intermediately between the right mower handle 12 section and the left mower handle section 14 substantially as shown in FIG. 1.

Figure 2:
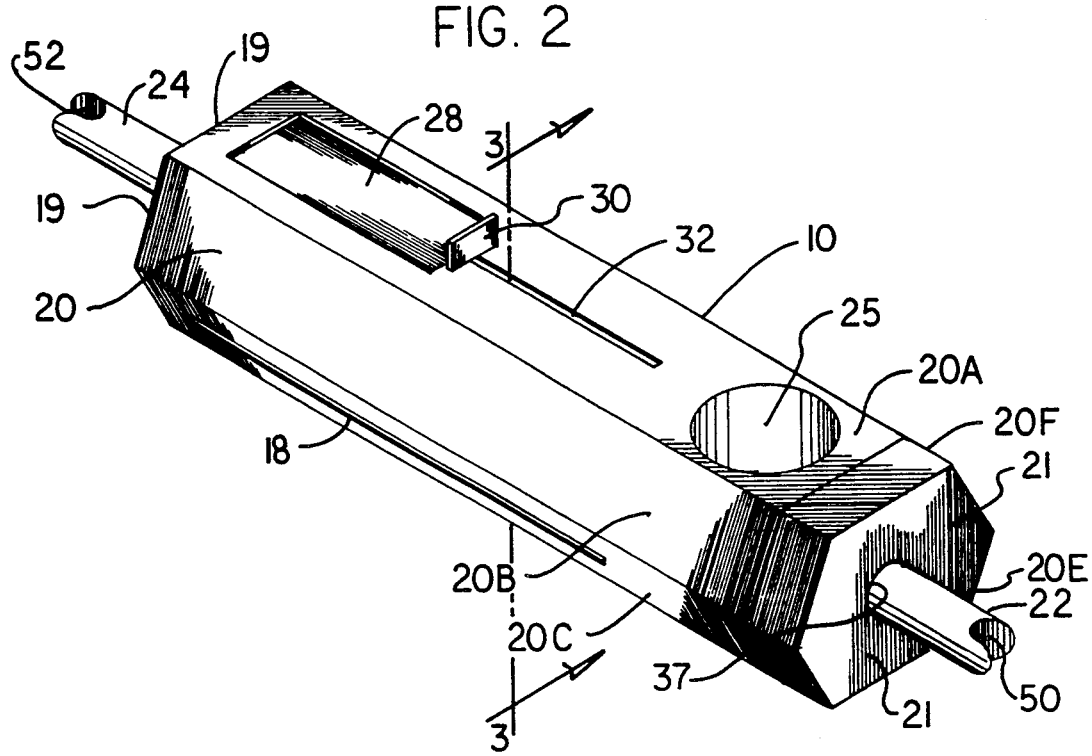
FIG. 2 is a perspective view of the lawn mower attachment.

FIG. 2 shows the dispenser 10 in perspective. A generally hexagonal housing 10 forms the main structure of the dispenser 10. The housing 20 includes six rectangular panels including an upper panel 20A, a bottom panel 20D, an upper right panel 20F, a lower right panel 20G, an upper left panel 20B, and a lower left panel 20C. A hexagonal left panel 19 and a hexagonal right panel 21 connect the six rectangular panels in a generally hexagonal configuration substantially as shown. The housing 20 has a right attachment bar 22 and a left attachment bar 24 which are adapted to securely engage the right mower handle section 12 and the left mower handle section 14, respectively. In accordance with the invention, conventional plastic trash bags 34 are stored internally of the housing 20 and are adapted to be dispensed therefrom through dispenser slot 18 which is located on the lower left panel 20C.

Figure 3:
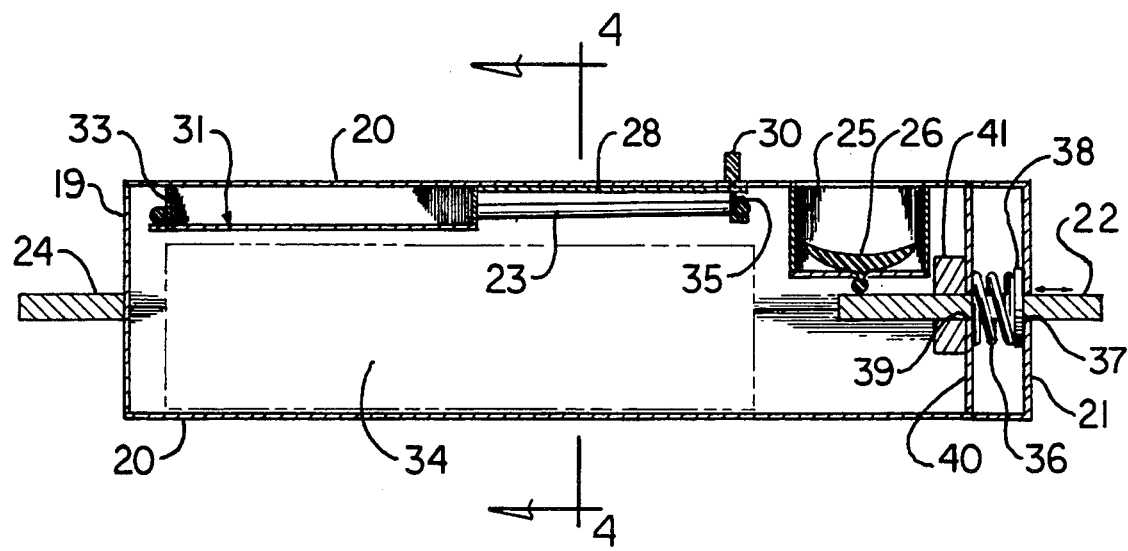
FIG. 3 is a cross-sectional view of the lawn mower attachment of FIG. 2 taken along line 3—3 thereof.
Figure 4:
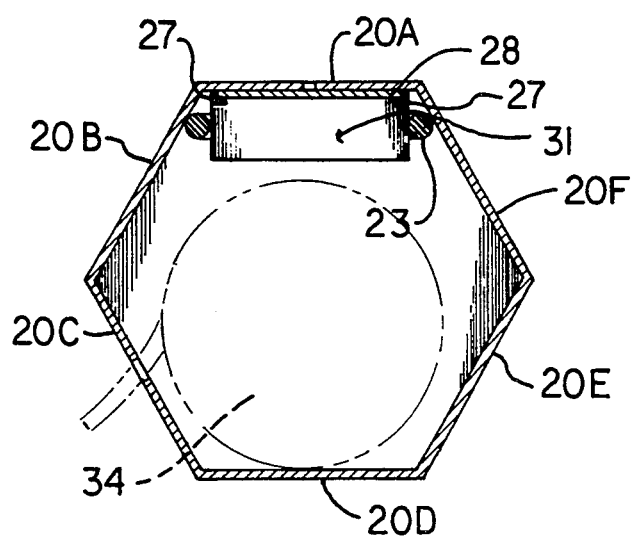
FIG. 4 is a cross-sectional view of the lawn mower attachment of FIG. 3 taken along line 4—4 thereof.
Figure 7:
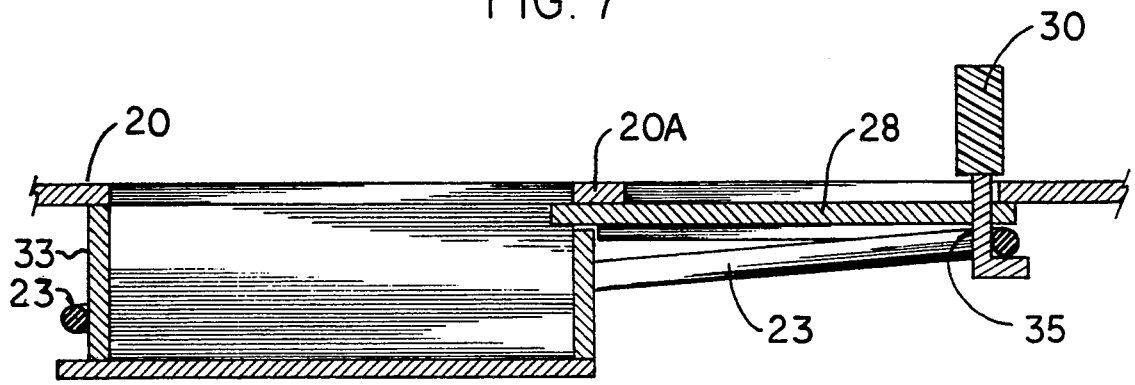
FIG. 7 is a cross-sectional view of the lawn mower attachment of FIG. 5 taken along line 7—7 showing the storage area.

A rectangular storage bin 31 is located on the upper panel 20A in a downwardly depending orientation with respect thereto. The storage bin 31 has a cover 28 connected to a handle 30 adapted to slidably close the opening of the bin in the upper panel. A slot 32 is provided on the upper panel 20A which permits the handle 30 to move to the right with the cover 28. The cover 28 is seated on a set of L-shaped parallel spaced guide members 27 suitably affixed to the underside of top or upper panel 20A (FIG. 4). An endless elastic band 23 is provided circumferentially engageble about the L-shaped end wall 33 of bin 31 and an L-shaped flange 35 suitably affixed to the underside of upper panel 20A underneath the right-most end of slot 32 (FIG. 3) and which is adapted to normally urge and maintain the cover 28 in a closed position over the bin opening. The storage bin 31 is provided to keep plastic trash bag tie members easily accessible. The storage bin 31 is kept closed by the elastic member 23 to prevent the tie members from vibrating out of the storage area 31. The storage bin 31 with the cover 28 in the open and closed position is shown in FIGS. 5 and 6, respectively.

As mentioned above, the lawn mower attachment 10 is adapted to be affixed to the lawn mower 15 transversely between the right mower handle section 12 and the left mower handle section 14 so as to be conveniently accessible to a user pushing or guiding the lawn mower in the usual manner. In order to securely affix the dispenser 10 to a wide variety of lawn mowers having different handle sizes, the dispenser features a fixed attachment bar (left bar 24) and an opposed attachment bar (right bar 22) capable of limited axial movement relative to the longitudinal axis or extent of the dispenser housing. Referring now to FIG. 3, wherein a cross-sectional view of the lawn mower attachment 10 is shown, it will be seen that means are provided for facilitating the aforementioned limited axial movement of the right attachment bar. In accordance with the preferred embodiment of the invention, such means comprises a helical spring 36 nested about a proximal portion of the right attachment bar 22 which extends into the interior of the dispenser housing through a suitable central opening 37 in hexagonal end wall 21. A spring retainer or washer 38 is suitably affixed to the right attachment arm 22 and engages the right end of the spring 36.

An inner hexagonal wall 40 fixedly disposed inside the dispenser housing to the left of outer wall 21 substantially as shown has a central opening co-axially aligned with opening 37 for slidably and axially receiving the proximal end portion of movable attachment arm 22. The fixed inner wall 40 provides a bearing surface for the left end of spring 36 and for a threaded nut 41 serving as a locking collar to limit movement of attachment arm 22 to the right. As illustrated, nut 41 is fixedly secured to the proximal end portion of attachment arm 22 via suitable complimentary threads (not shown) provided thereon. When the right attachment bar 22 is moved inwardly or to the left as viewed in FIG. 3, spring retainer 38 compresses spring 36 against the inner wall 40. At the distal end of the right attachment arm 22 is a is a right fitted edge 50 whereas at the distal end of the left attachment arm 24 is a left fitted edge 52. The right fitted edge 50 and the left fitted edge 52 are generally C-shaped and are designed to snugly engage the right mower handle section 12 and the left mower handle section 14, respectively, when the dispenser housing is positioned transversely therebetween in a manner now believed apparent. Thus, to secure the lawn mower attachment 10 to the lawn mower 15, the left fitted edge 52 is placed against the left mower handle 14, the right attachment arm is axially compressed or moved inwardly and to the left into the housing (against the resilient counterforce of spring 36) and the right fitted edge 50 is placed against the right mower handle section 12. The right attachment arm 12 is then released which results in spring 36 and spring retainer 38 urging the arm to extend securely to the right against the right mower handle section 12.

Figure 8:
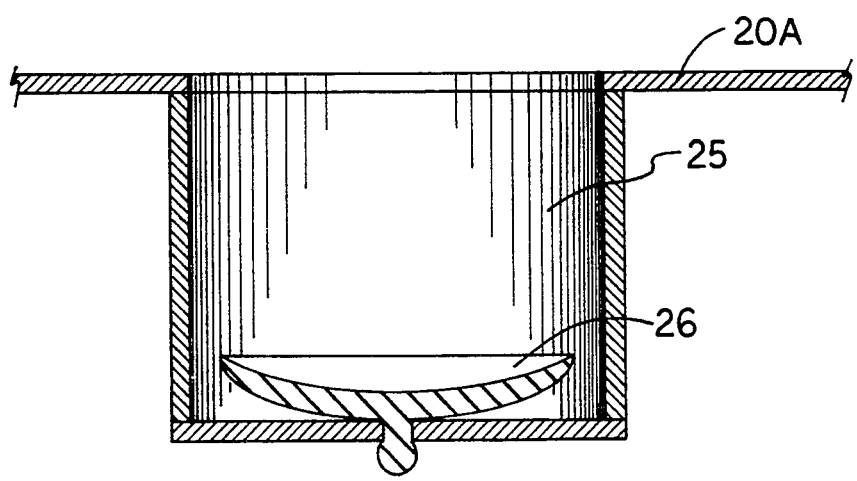
FIG. 8 is a cross-sectional view of the lawn mower attachment of FIG. 5 taken along line 8—8 showing the beverage holder with suction cup.

Referring now to FIG. 8, a beverage holder 25 is provided in the upper panel 20A. The beverage holder 25 is a generally cylindrical cavity which has a suction style cup 26 connected to the bottom of the holder 25. The suction cup 26 would secure the beverage container to the lawn mower attachment, whether the beverage container be a cup, can or bottle. In this fashion, one may comfortably drink a beverage while mowing the lawn.

Once the lawn mower attachment 10 is secured to the lawn mower 15, the plastic trash bags 34 may be removed through slot 18. The bags 34, once filled with clippings, may be secured with a twist tie stored in the storage area 31 and then disposed of in a proper fashion. If desired, a drink may be consumed while working, which may be held securely in beverage holder 25.

In order to place a conventional roll of plastic trash bags 34 into the housing, left wall 19 may be made removable from the housing in a suitable manner. Alternatively, one or more of certain of the panels, e.g. panels 20C and 20D, may be formed as a single pivotal panel hingedly connected to the remainder of the dispenser housing, say, along the seam between panels 20D and 20E, and suitable detent means provided between the single panel and the housing to facilitate opening and closing of the pivotal panel.

It is apparent from the above that the present invention accomplishes all of the objectives set forth by providing a new and improved lawn mower attachment which dispenses plastic trash bags which permits the efficient clean up of the recently mowed lawn.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims. For example, while the preferred embodiment of the dispenser has a hexagonal cross-sectional shape, a square, rectangular, cylindrical, elliptical, or other shape may be utilized instead without departing from the principles of the invention.

Thus, while the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed is as follows:

1. A lawn mower attachment for use with a lawn mower to store and dispense bags to dispose of lawn clippings comprising:
   a housing, said housing having a hollow interior,
   an attachment means, said attachment means including a first bar and a second bar,
   a plastic bag storage area, said bag storage area located in said hollow interior,
   dispensing means, said dispensing means including an access slot for said bags in said housing communicating with said hollow interior whereby said attachment is adapted to affix to a lawn mower and said bags are adapted to dispense through said access slot and utilized to dispose of clippings,
   wherein said housing has a first end panel and a second end panel, said first end panel having said first bar secured thereto and extending laterally therefrom, and said second end panel having said second bar secured thereto and extending laterally therefrom, said second bar being further connected to bar extension means, and
   wherein said housing has a top panel extending between said first and second end panels, said housing further including a storage area located below said top panel in said housing interior, said top panel having an opening communicating with said storage area.

2. The lawn mower attachment of claim 1 wherein said housing includes six elongated rectangular side panels extending between said first and second end panels, said six side panels including said top panel, a rear upper panel, a rear lower panel, a bottom panel, a front bottom panel, and a front upper panel, whereby said housing has a hexagonal cross-sectional shape.

3. The lawn mower attachment of claim 1 wherein said top panel further includes a cylindrical cavity.

4. The lawn mower attachment of claim 3 wherein said housing has a lower side panel extending between said first and second end panels and said dispensing means is located on said lower side panel.

5. The lawn mower attachment of claim 4 wherein said cylindrical cavity includes a bottom wall extending into said hollow interior.

6. The lawn mower attachment of claim 5 wherein said bar extension means includes a spring which allows said second bar to move laterally, whereby said second bar may be laterally displaced to permit said attachment to be secured to said lawn mower.

7. The lawn mower attachment of claim 6 wherein said cylindrical cavity includes a suction cup, said suction cup attached to said bottom wall.

8. The lawn mower attachment of claim 7 wherein said rectangular storage area includes a cover means.

9. The lawn mower attachment of claim 8 wherein said cover means includes a lid, and said lid is movable.

10. The lawn mower attachment of claim 9 wherein said lid is held over said rectangular storage area by an elastic member.

11. The lawn mower attachment of claim 10 wherein said cover means includes a handle, said handle is connected to said lid whereby said rectangular storage area may be accessed.

* * * * *